United States Patent [19]

Dennis

[11] Patent Number: 4,592,033
[45] Date of Patent: May 27, 1986

[54] APPARATUS FOR IMPROVING THE DATA TRANSMISSION RATE IN A TELEMETRY SYSTEM

[75] Inventor: Charles L. Dennis, Richardson, Tex.

[73] Assignee: Mobil Oil Corporation, New York, N.Y.

[21] Appl. No.: 490,906

[22] Filed: May 2, 1983

[51] Int. Cl.$^4$ .......................... G01V 1/40; H03G 3/00
[52] U.S. Cl. ....................................... 367/76; 375/36; 178/63 R; 367/65; 340/853
[58] Field of Search ............... 340/853, 861, 856, 857; 375/2.2, 3, 36; 178/63 R, 63 A, 63 E; 367/76, 65, 80, 67, 177, 63; 330/109, 278, 101

[56] References Cited

U.S. PATENT DOCUMENTS 4,072,906  2/1978  Schroder ............................. 330/109
4,099,022  7/1978  Fullerton et al. ....................... 367/4

OTHER PUBLICATIONS

Text by Wait et al., entitled "Introduction to Operational Amplifiers Theory & Applications," McGraw-Hill, Inc., 1975, pp. 27-30.

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

The data transmission rate in a cable telemetry system is improved by preconditioning an encoded data signal prior to discriminating and decoding it with a filter/amplifier employing an operational amplifier having a non-inverting input connected to receive the data signal, an inverting input which is grounded through a series connected resistance and capacitance and an output which is feedback connected to said inverting input by a resistance.

7 Claims, 5 Drawing Figures

APPARATUS FOR IMPROVING THE DATA TRANSMISSION RATE IN A TELEMETRY SYSTEM

BACKGROUND

1. Field of the Invention

The present invention relates to an apparatus for improving the transmission rate of encoded data and, more particularly, relates to an apparatus for improving the telemetry transmission rate through a lengthy armored well logging cable of manchester encoded data obtained in a well logging operation.

2. Discussion of the Prior Art

Data acquisition techniques employed in well logging operations produce extensive quantities of data which must be transmitted from borehole encoding equipment to a surface located data discriminator/decoder by way of an armored well logging cable. Because of the extensive distances typically employed in the transmission path, e.g., 25,000–35,000 feet, electrical band pass characteristics of the armored cable employed for transmission place severe electrical constraints on the speed with which data can be transmitted. Typically, the lengthy cable attenuates higher frequency components of the data signal to a greater degree than lower frequency components, making uniform amplitude detection of all frequency components difficult. Increasing the data speed increases the frequency of the various components of the encoded data signal and thus decreases reliability of data detection.

Various attempts have been made to increase the speed of data transmission in the environment just described, including the proper use of line terminating impedances and the use of sophisticated data transmitters and receivers, with some limited success. However, even with these techniques, some of which are very complex and expensive, it has been difficult to obtain reliable data transmission rates of over 40K bits/sec. This is particularly true with manchester encoded data, which has widely dispersed frequency components at, for example, frequencies of $f_c$, $f_c/2$, and $f_c/3$ or $f_c/4$. These widely dispersed frequency components are distorted to different degrees by the bandpass characteristics of the armored cable, making their detection and proper decoding particularly difficult.

SUMMARY OF THE INVENTION

The present invention has been designed to further improve the transmission data rate of encoded information in a telemetry system.

Accordingly, one object of the invention is the provision of an apparatus which improves the data transmission rate attainable in an extended length cable telemetry transmission system by conditioning a data signal, particularly a manchester encoded data signal, prior to its application to discriminating and decoding apparatus so that it can be more easily and reliably detected.

Another object of the invention is the provision of an apparatus which improves the data transmission rate of an encoded data signal in an extended length cable telemetry system by means of a relatively simple filter/amplifier circuit construction interposed between the cable and data discriminating and decoding apparatus.

Another object of the invention is the provision of an apparatus which improves the data rate of a manchester encoded data signal in an extended length cable telemetry system by means of a specific signal input configuration to a filter/amplifier provided between the cable and data detecting and decoding apparatus.

These and other objects, advantages and features of the invention will be more clearly appreciated from the following detailed description of the invention, presented in connection with the accompanying drawings in which:

DETAILED DESCRIPTION OF THE INVENTION

Figure 1:
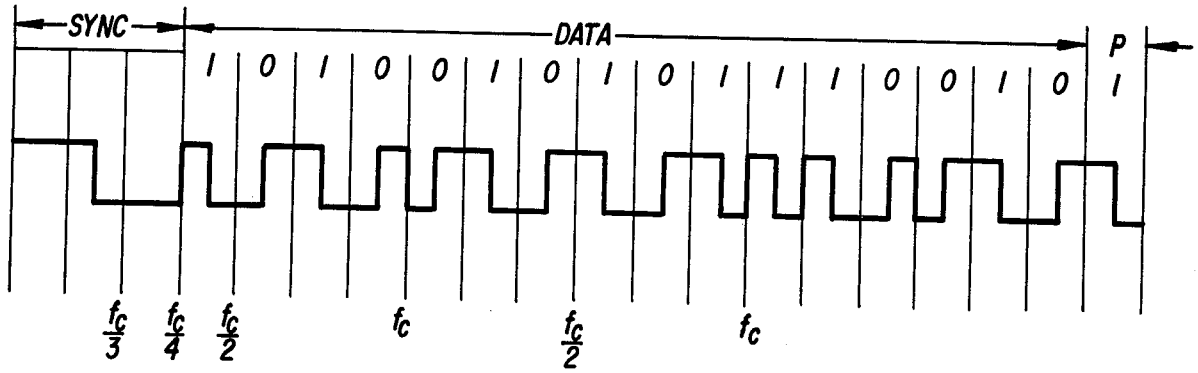
FIG. 1 illustrates a manchester encoded data signal.

FIG. 1 illustrates a typical manchester encoded data word produced by a commercially available manchester data encoder (Harris HD-15530). It contains 20 data bits in the form of a 3 bit wide sync signal, 16 bits of data, and a parity bit. FIG. 1 also illustrates the various primary frequency components which are typically associated with a manchester encoded data word. As illustrated, a high frequency primary component $f_c$ is produced whenever successive ones and zeros occur, a middle frequency primary component $f_c/2$ is produced whenever a transition between ones and zeros occurs, and a low frequency primary component of approximately $f_c/3$ or $f_c/4$ (depending on the encoded level of the data immediately preceding and succeeding the sync signal) occurs whenever the sync signal is present. Other lower and higher frequency harmonics are also present.

Figure 2:
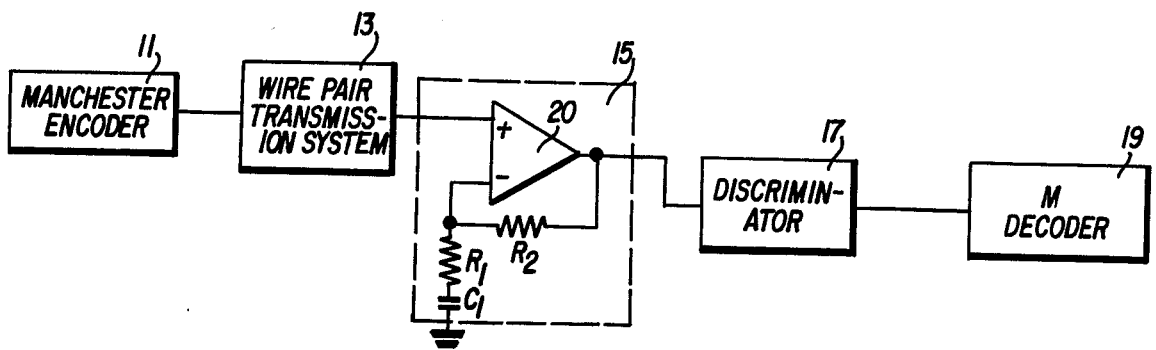
FIG. 2 illustrates in partly block, partly schematic form of one embodiment of the invention.

A representative wire pair telemetry transmission system employing manchester encoding is illustrated in FIG. 2. A manchester encoder 11, such as the commercially available integrated circuit described above, is used to produce and apply encoded data to a wire pair transmission line 13 in a conventional manner. A data discriminator 17 and data decoder 19 receive, detect and decode the data signal appearing at the end of transmission line 13, also in a conventional manner.

Because of the wide frequency bandwidth of the manchester encoded signal, and the relatively high frequency components thereof, the encoded data signal can be severely and non-uniformly amplitude distorted by transmission line 13, particularly when extended distances are involved such as in borehole telemetry applications where the transmission line is a logging cable typically 25,000–35,000 feet long. In the invention, a filter/amplifier circuit 15 is inserted between the transmission line 13 and the data discriminator 17 to improve the fidelity of the transmitted signal and thus enhance the reliability of its detection by discriminator 17.

The filter/amplifier circuit 15 is formed by an operational amplifier 20, a series connected resistor $R_1$ and capacitor $C_1$ connected between an inverting input of operational amplifier 19 and ground, and a feedback resistor $R_2$ connected between the inverting input of operational amplifier 20 and the output thereof. The data signal appearing on transmission line 13 is connected to the non-inverting input of operational amplifier 20. An important aspect of the invention is the connection of the encoded data signal to the non-inverting input of operational amplifier 20. The reason for this will be understood from the following discussion presented in connection with FIGS. 4 and 5.

Figure 4:
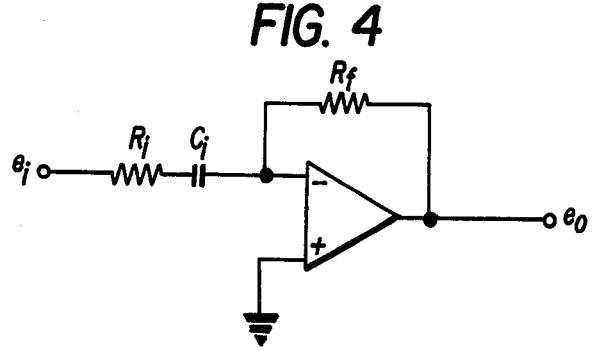
Figure 5:
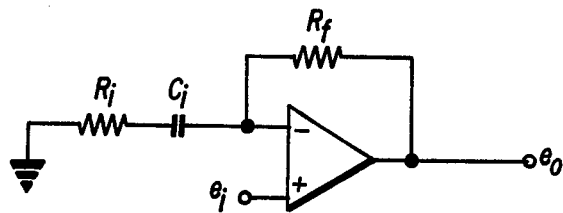

FIG. 4 illustrates a filter/amplifier circuit with an input impedance formed of a series connected capacitance $C_i$ and resistance $R_i$ and a feedback impedance formed of resistance $R_f$ connected to its inverting input. An input signal $e_i$ is applied to the input impedance, and the non-inverting input is grounded. FIG. 5 represents the same circuit, but with the input signal $e_i$ applied to the non-inverting input and the input impedance formed of $R_i$ and $C_i$ grounded.

The FIG. 4 circuit has a transfer function $H(s)$ (using La Place transforms) as follows:

$$\left| \frac{e_0}{e_i} \right| = \frac{SR_f}{R_i\left(S + \frac{1}{R_iC_i}\right)}$$

The transfer function $H(s)$ for the FIG. 5 circuit is:

$$\frac{e_0}{e_i} = \left(1 + \frac{R_f}{R_i}\right)\left(\frac{S + \frac{1}{C_i(R_f + R_i)}}{S + \frac{1}{C_i(R_i)}}\right)$$

Figure 3:
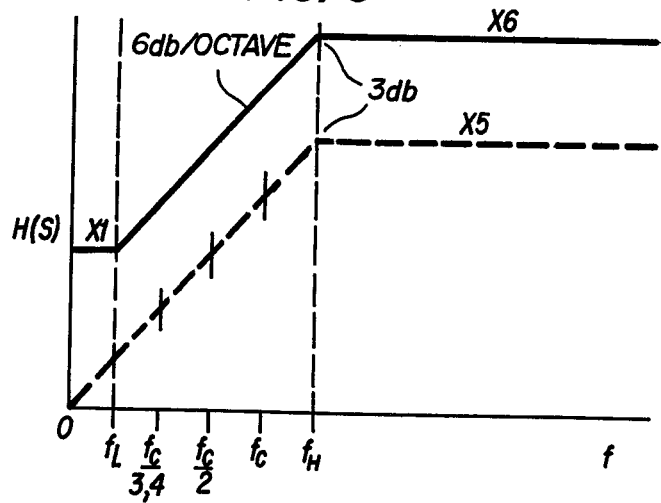
FIG. 3 is a graphic illustration of the transfer function of an essential part of the invention depicted in FIG. 2; and, FIGS. 4 and 5 are representative schematic diagrams which are useful in explaining an important aspect of the present invention.

The difference between these transfer functions is important to the invention. The transfer function $H(s)$ for FIG. 5, which corresponds to the filter/amplifier 15 configuration of FIG. 2, is shown in solid lines in FIG. 3, while that for the FIG. 4 circuit is shown by dotted lines in FIG. 3. As shown, the transfer function of the FIG. 4 circuit exhibits a response drop-off to zero from the 3 db frequency roll off point. Accordingly, there is little gain applied to an input signal at low frequencies and no gain at DC. By contrast, the transfer function for the FIG. 5 circuit exhibits a gain (X1) even at low frequencies and at DC, thus enhancing the amplitude of all DC and low frequency components. The low frequency amplitude enhancement property of the FIG. 5 circuit is employed in the invention to boost the amplitude of the low frequency components (including any subharmonics) of a manchester encoded signal, making it easier for discriminator 17 to properly detect the encoded signal. By suitably choosing component values for $R_1$, $R_2$ and $C_1$, all manchester encoded signal frequency components can be located to fall on the 6 db/octave slope of filter/amplifier 15, as illustrated in FIG. 3, thus restoring to a significant degree the amplitude distortion of the encoded signal caused by its passage through transmission line 13. Typical components values for the FIG. 2 circuit which will produce a transfer function where all the primary frequency components of the manchester encoded data signal reside on the 6 db/octave slope of the transfer function are $R_1 = 10K$, $C_1 = 55$ pf and $R_2 = 50K$. With these values, the lower and upper break frequencies $f_l$, $f_h$ in the FIG. 3 transfer function are approximately 47 Khz and 284 Khz, respectively, which accomodate the wide bandwidth, i.e., the primary frequency components $f_c$, $f_c/2$ and $f_c/3$, ($f_c/4$), of a manchester encoded signal. The gain of the filter/amplifier circuit 15 is approximately X1 at frequencies below $f_l$ and X6 at frequencies above $f_h$. An exemplary operational amplifier 20 which can be used in the invention is a Harris Model No. 2520.

It has been found that with the circuit illustrated in FIG. 2 and employing the above-noted values for $R_1$, $R_2$ and $C_1$, reliable manchester encoded data transmission rates of up to 150–300K bits/sec can be obtained in a transmission system having extended cable lengths on the order of 25,000 feet.

The circuit of FIG. 1 has been found to be particularly useful when a manchester encoded signal is applied from data source 11, but the circuit would also have utility with other encoded signals having widely dispersed frequency components. Moreover, although a one-stage filter/amplifier 15 has been shown and described, a plurality of such stages could be cascaded, depending on the attenuation characteristics of the transmission line 13.

Although one preferred embodiment of the invention has been described and illustrated, many modifications can be made thereto without departing from the spirit and scope of the invention. Accordingly, the invention is not limited by the foregoing description, but is only limited by the scope of the claims appended hereto.

I claim:

1. An apparatus for improving the transmission rate of a manchester encoded data signal comprising:
   means for supplying a manchester encoded data signal having different primary frequency components;
   an operational amplifier having inverting and non-inverting inputs and an output, said non-inverting input being connected to the output of said supplying means;
   a first capacitor and a first resistor connected in series between a ground potential and the inverting input of said operational amplifier; and,
   a second resistor connected between the inverting input of said operational amplifier and its output,
   the transfer characteristic of the circuit formed by said operational amplifier, first and second resistances and capacitor producing an amplification of all primary frequency components of said manchester encoded data signal.

2. An apparatus as in claim 1, wherein the values of said first capacitor, said first resistor and said second resistor are such that the transfer function of said circuit has a lower break frequency, a higher break frequency, an approximately linear 6 db/octave amplification characteristic between said lower and higher break frequency, and a substantially constant first amplification characteristic at frequencies above said higher break frequency and a substantially constant second amplification characteristic at frequencies below said lower break frequency.

3. An apparatus as in claim 2, wherein said first capacitor has a value of approximately 55 pf, said first resistor has a value of approximately 10K, and said second resistor has a value of approximately 50K, and said first break frequency is approximately 47 KHz and said second break frequency is approximately 284 KHz.

4. An apparatus as in claim 1, wherein said operational amplifier, first and second resistors and capacitor form a filter/amplifier stage and said apparatus further comprises at least two said stages connected in cascade.

5. An apparatus as in claim 1, further comprising a data discriminator connected to the output of said operational amplifier and a manchester data decoder connected to the output of said discriminator.

6. An apparatus as in claim 1, wherein said supplying means includes a manchester data encoder and a transmission line connecting the output of said encoder to the non-inverting input of said operational amplifier.

7. An apparatus as in claim 6, wherein said transmission line is a well logging cable.

* * * * *